United States Patent Office 3,287,382
Patented Nov. 22, 1966

3,287,382
VITAMIN A ACID ESTER OF VITAMIN A
Pieter Henri van Leeuwen, Van Houtenlaan, Weesp, Netherlands, assignor to North American Philips Company, Inc., New York, N.Y., a corporation of Delaware
No Drawing. Filed Apr. 23, 1963, Ser. No. 274,914
Claims priority, application Netherlands, Apr. 27, 1962, 277,834, 277,835
1 Claim. (Cl. 260—410)

This case relates to the preparation of a new and novel ester of vitamin A and the method of preparing vitamin A from this ester.

It is known to esterify the vitamin A alcohol in order to obtain compounds having vitamin A activity which have a greater stability than vitamin A. It has been proposed, for example, in U.S.A. patent specification 2,971,-966, to produce higher fatty acid esters of vitamin A which in addition to satisfactory stability have satisfactory solubility in fats.

However, these known higher fatty acid esters of vitamin A while exhibiting a fairly satisfactory stability do not exhibit highly satisfactory biological activities.

It is therefore a principal object of my invention to provide a new and novel ester of vitamin A that exhibits at least the degree of stability as these known esters while at the same time exhibiting a more satisfactory degree of biological activity and a method of providing such an ester.

Another principal object of my invention is to provide a new and novel method for the production of vitamin A.

These and other objects of my invention will be apparent from the description that follows.

According to one aspect of my invention, a new and novel ester of vitamin A is produced by esterifying vitamin A with vitamin A acid. This new compound prepared in accordance with the invention has a high stability, is readily soluble in fats and has a materially higher biological activity than the known higher fatty acid esters of vitamin A.

According to another aspect of my invention this ester is also of importance as a particularly suitable form in which the vitamin A may be stored for a comparatively long period of time because it has been found that after this storing period a molecule of this ester is quantitatively convertible into two molecules of vitamin A by a simple reduction, as will be described hereafter.

The esterification reaction in accordance with my invention may, for example, be performed by reacting vitamin A alcohol with vitamin A acid or a suitable derivative of vitamin A acid. The reaction of the alcohol with the free acid must be performed under dehydrating conditions. Any of the known dehydrating agents employed may be used for example $CaCl_2$, $POCl_3$, or $P_2O_5$ in triethylamine or in pyridine in esterification reactions of this kind. However, dicyclohexylcarbodiimide is preferably used in this case. Suitable derivatives of vitamin A acid are, for example, the acid anhydride and the acid halides, preferably the acid chloride. These esterification reactions may be carried out by known methods. To the reaction mixture of vitamin A and acid halide there is preferably added an acid binder, suitable acid binders being organic bases, for example, pyridine or collidine.

According to another known method of esterification, the new ester according to the invention is produced by reacting vitamin A acid halide with a metal alcoholate of vitamin A, for example, the sodium, potassium or lithium vitamin A alcoholate.

It has been found, however, that the esterification in accordance with my invention proceeds particularly smoothly if a so-called ester interchange method is used. In such a transesterification an ester of vitamin A acid is reacted with vitamin A alcohol or with an ester of vitamin A alcohol. This ester interchange reaction is preferably carried out in the presence of a catalyst. Suitable ester interchange catalysts are, for example, alkali metal or alkaline earth alcoholates, oxides or hydroxides, such as sodium ethylate, lithium methylate, potassium methylate, barium methylate, calcium methylate, magnesium isopropylate, potassium hydroxide, calcium hydroxide, barium oxide, amides, such as sodium, calcium or potassium amide, phenolates, such as sodium phenolate or calcium phenolate, or compounds such as phenyl lithium or butyl lithium. Very good results have been obtained with the aid of sodium methylate as a catalyst. The ester interchange reaction is preferably performed in a solvent, suitable solvents beings, for example, aromatic hydrocarbons, such as benzene or toluene, aliphatic hydrocarbons, such as petroleum ether or cyclohexane, and ethers, such as n-butyl ether, Diethylcellosolve (diethylether of glycol), the dimethylether of diethylene glycol or dioxane. By using an ester of a vitamin A acid with a lower aliphatic alcohol of 1 to 6 carbon atoms, preferably the methyl or ethyl ester and either the free vitamin A or a vitamin A ester with a lower aliphtatic carboxylic acid of 1 to 6 carbon atoms during the transesterification, a low boiling alcohol or ester is formed, which may be withdrawn from the reaction mixture by distillation. Hence, the methylester of vitamin A acid and the free vitamin A alcohol or vitamin A acetate are preferably used.

After the ester interchange reaction, which may be carried out by known methods, the reaction product is obtained as a light-yellow syrup from which my novel ester crystallizes, after a seeding, if required.

My new ester of vitamin A may be used similarly to vitamin A in pharmaceutical preparations, in a mixture with other vitamins, in the usual liquid or solid carrier materials. Furthermore, my new ester may be used in the manner usual for vitamin A as a food supplement, for which purpose it may be used in the form of a powder, together with other vitamins and/or minerals and antioxidants, in an enveloping substance, for example, gelatin or pectin or a waxy material.

According to another aspect of my invention, vitamin A is produced by reduction of my novel ester. In this reduction two molecules of vitamin A are obtained from one molecule of the ester, which enables vitamin A to be kept in a stable form during the storing period, after which the vitamin A alcohol can be simply obtained from this stable form in accordance with the invention.

The reduction of the vitamin A acid ester of vitamin A is preferably carried out with the aid of a complex metal hydride or metal alkyl hydride. Suitable substances, are, for example, $LiAlH_4$, $NaBH_4$, $NaAlH_4$, $KBH_4$ and dialkyl aluminum hydrides, such as diisobutyl aluminum hydride.

The reduction is performed in an inert solvent, for example, an ether, for example tetrahydrofurane, dioxan or diethyl ether, an aliphatic hydrocarbon, for example petroleum ether, cyclohexane, or an aromatic hydrocarbon, for example, benzene or toluene.

The reduction with the aid of sodium or potassium borohydride may also be performed in aqueous alcohol. Lithium aluminum hydride in ether, diisobutyl aluminum hydride in benzene or petroleum ether or sodium borohydride in aqueous alcohol are preferably used.

The reaction is preferably carried out by adding a solution of the ester drop by drop to a solution of the reducing agent. An excess, for example a 10%–100% excess of the reducing agent is preferably used and decomposed on completion of the reduction. After the reaction mixture has been successively washed with dilute acid, dilute alkali and water and after concentration by evaporation of the solvent the vitamin A is quantitatively obtained.

My invention will now be described more fully with reference to the following examples:

Example I

In a round-bottomed flask of 1 l. provided with a distillation fixture with a reflux cooler, 230 mms. of sodium metal were dissolved in 5 mls. of absolute methanol. The excess of methanol was removed in a vacuum. The sodium methylate was covered with a layer of benzene of about 50 mms., after which a solvent of 32.8 gms. (0.1 mole) of pure vitamin A acetate and 31.4 gms. (0.1 mole) of pure vitamin A acid methylester in 400 mls. of dry benzene was added. The mixture was slowly heated, methylacetate distilling over at about 55° C. The ester interchange reaction was completed by distilling off about 200 mls. of the solvent for 1.5 hours. After the reaction mixture had assumed room temperature, the liquid was washed successively with 300 mls. of 0.1 N sulphuric acid, 300 mls. of dilute sodium bicarbonate solution and 300 mls. of distilled water. The organic liquid was then dried with the aid of magnesium sulphate and the solvent was removed under reduced pressure. The residue, a light-yellow syrup, crystallized slowly. Yield: 56 gms. of a product having a melting point of about 25° C.

$$E_{1\,cm.}^{1\%} = 1120 \text{ at } \lambda_{max} = 342 \text{ m}\mu$$

vitamin A acid vitamin A ester.

Example II

In a manner entirely similar to that described in Example I, vitamin A acid methylester was converted into the vitamin A ester with the free vitamin A alcohol. The yield was 98% of the theoretical yield of a light-orange product having a melting point of about 25° C.

$$E_{1\,cm.}^{1\%} = 1100 \text{ at } \lambda_{max} = 342 \text{ m}\mu$$

Example III

Under dry nitrogen a solution of 5.68 grams (0.01 mol) of vitamin A acid vitamin A ester in 100 mls. of dry diethylether was added dropwise while stirring at −50° C. to a solution of 0.40 grams of LiAlH$_4$ in 15 mls. of dry diethyl ether. When after about 10 minutes the reduction was completed, 20 mls. of absolute ethanol were added drop by drop while stirring again at a temperature of −50° C. When the reaction mixture had assumed room temperature 20 mls. of water were added, after which the mixture was washed with 300 mls. of 0.1 N sulphuric acid, 300 mls. of dilute sodium bicarbonate solution and subsequently with water to neutral. After the organic liquid had been dried with the aid of magnesium sulphate, the solvent was removed under reduced pressure. The residue crystallized after seeding. 5.65 grams of vitamin A were obtained.

$$E_{1\,cm.}^{1\%} = 1790 \text{ at } \lambda_{max} = 325 \text{ m}\mu$$

Example IV

A solution of 5.68 grams of vitamin A acid vitamin A ester in 100 mls. of petroleum ether (boiling point from 40–60° C.) was added drop by drop under dry nitrogen while stirring at room temperature to a solution of 6 grams of diisobutyl aluminum hydride in 50 mls. of petroleum ether. When after about 10 minutes all the ester had been added to the reducing agent, the excess of the reducing agent was decomposed by the addition of 25 mls. of 96% ethanol. 20 mls. of water were then added. The product was washed in succession with 300 mls. of 0.1 N sulphuric acid, 300 mls. of dilute sodium bicarbonate solution and with water to neutral. After drying with the aid of magnesium sulphate and after removal of the solvent under reduced pressure, 5.7 grams of vitamin A were obtained.

$$E_{1\,cm.}^{1\%} = 1800 \text{ at } \lambda_{max} = 325 \text{ m}\mu$$

Example V 5.68 grams of vitamin A acid vitamin A ester were dissolved in 100 mls. of 90% ethanol and then added drop by drop at room temperature, in a period of about 15 minutes, to a solution of 0.40 grams of NaBH$_4$ in 20 mls. of 90% ethanol which had been rendered mildly alkaline with an alcoholic alkaline solution. 300 mls. of 0.1 N sulphuric acid were then slowly added drop by drop. The reaction mixture was subsequently extracted with 3×250 mls. of diethyl ether. The etherial liquid was washed twice with 200 mls. of dilute sodium bicarbonate solution and then twice with 200 mls. of water, after which it was dried with the aid of magnesium sulphate. After removal of the solvent under reduced pressure, 5.5 grams of vitamin A were obtained.

$$E_{1\,cm.}^{1\%} = 1780 \text{ at } \lambda_{max} = 325 \text{ m}\mu$$

While I have described my invention in connection with specific embodiments and applications, other modifications thereof will be readily apparent to those skilled in this art without departing from the spirit and scope of the invention as defined in the appended claim.

What I claim is:

The vitamin A acid ester of vitamin A.

References Cited by the Examiner
UNITED STATES PATENTS

| | | | |
|---|---|---|---|
| 2,169,195 | 8/1939 | Hickman et al. | 260—410 |
| 2,686,180 | 8/1954 | Schmidt et al. | 260—410.9 |
| 2,907,796 | 10/1959 | Klein | 260—617 |
| 2,971,966 | 2/1961 | Stieg et al. | 260—410 |
| 3,046,310 | 7/1962 | Kardys | 260—617 |
| 3,136,794 | 6/1964 | Maxwell | 260—410 |

FOREIGN PATENTS 532,371   10/1959   Canada.

CHARLES B. PARKER, *Primary Examiner.*

A. H. SUTTO, *Assistant Examiner.*